Patented Dec. 14, 1943

2,336,597

UNITED STATES PATENT OFFICE 2,336,597

CONVERSION OF HYDROCARBON OILS

Gerald C. Connolly, Baton Rouge, La., assignor to Standard Oil Development Company, a corporation of Delaware No Drawing. Application August 23, 1940, Serial No. 353,919

4 Claims. (Cl. 196—52)

This invention relates to the conversion of hydrocarbon oils and pertains more particularly to a method of cracking oils in the presence of a synthetic gel catalyst prepared as hereinafter described.

The primary object of the present invention is to use an improved catalyst for cracking hydrocarbon oils.

I have found that catalysts having a high order of activity for cracking hydrocarbon oils can be obtained by dispersing either the dry silica gel or hydrous oxide of silica throughout an alumina hydrosol. This dispersion can be obtained by thoroughly mixing the hydrogel in the hydrosol by any suitable stirring mechanism and, if desired, the hydrosol may be subjected to mild heating during this treatment.

The alumina hydrosol to which the silica gel is added may be prepared directly from metallic aluminum by treating powdered metallic aluminum with acetic acid or other organic acid. This reaction can be accelerated by the presence of a small percentage of mercury or mercuric compounds. As a result of this treatment, a substantially clear hydrosol of alumina can be obtained to which the silica gel is admixed in accordance with the present invention. If desired, the alumina hydrosol may be further concentrated previous to the mix, thereby assuring a thicker mix capable of more readily setting.

The alumina hydrosol may also be prepared from a purified gelatinous precipitate of alumina by treating the latter with acetic acid. During this treatment the gelatinous precipitate is peptized to form an alumina hydrosol, which upon standing would normally coagulate into an alumina hydrogel. In lieu of acetic acid, other organic acids, such as formic, and the like, may be employed.

Still another though less preferred method for preparing the alumina hydrosol is by dialysis.

Following the addition of the silica gel either in the dry or hydrous state to the alumina hydrosol, the resulting product coagulates into a hydrogel. Heat may be resorted to in order to speed up the rate of coagulation. This mass, in accordance with the present invention, is broken up into lumps and, if desired, washed free of reaction salts. The product is then dried and activated. The drying is preferably accomplished at relatively low temperatures, such as at about 212° F. or lower, until the bulk of the water has been removed. Following this, the product may be slowly heated to an activating temperature, such as up to 800° F., and may be maintained at said activating temperature for a substantial period, such as from 3 to 4 hours.

The relative amount of silica and alumina present in the final catalyst may vary over a substantial range. In general, the silica should predominate. Catalysts having molar ratios of silica to alumina of from 2 to 1 to 20 to 1 or somewhat higher form active cracking catalysts.

The silica which is combined with the alumina hydrosol, in accordance with the present invention, may be a dry silica gel or it may be a hydrous oxide of silica, such as, for example, silica hydrogel, a gelatinous precipitate of silica, or a heterogeneous mixture of silica hydrogel and gelatinous precipitate.

For best results the production of the silica gel or the silica hydrogel should be controlled so that the final silica gel product has an apparent density between 0.4 and 0.8.

For a better understanding of the invention, the following example may be helpful, it being understood that the values and conditions therein are illustrative rather than limitive.

Example 1

An alumina hydrosol was first formed by treating 2 parts of powdered metallic aluminum with 1 part of acetic acid in 100 parts of water to which $1/25$ of a part of mercuric oxide had been added. The resulting mixture was allowed to react at a temperature of about 70° C. until virtually all of the metallic aluminum had disappeared and a clear hydrosol of alumina was obtained. This product was then centrifuged to remove the mercury and any undecomposed aluminum.

To the hydrosol so formed, somewhat further concentrated by evaporation if need be, was added a silica hydrogel prepared according to conventional procedure. The conditions were controlled to form a clear silica hydrosol which upon standing coagulated into a hydrogel. The hydrogel so formed was then broken into lumps and washed free of soluble reaction products. A sample of this hydrogel upon drying had an apparent density of 0.6. The silica hydrogel so formed was divided into two portions. One of the portions was slowly dried at a temperature below 212° F. to form a dry silica gel.

One catalyst was prepared by mixing a portion of the silica hydrogel with the alumina hydrosol to form a mixture having a molar ratio of silica to alumina of approximately 5 to 1. This product after drying was slowly heated to a temperature of 900° F. and was thereafter ground and molded into pills.

Another catalyst was prepared according to the same procedure except that the dry, finely-divided silica gel was combined with the alumina hydrosol, the proportions being regulated to form a catalyst in which the molar ratio of silica to alumina was about 5 to 1 as in the first case.

The cracking activity of these catalysts was determined by passing an East Texas gas oil having an A. P. I. gravity of 33.8 in contact with the catalyst at a feed rate of 0.6 volumes of liquid oil per volume of catalyst per hour while maintaining the reaction zone at a temperature of 850° F. The length of the cracking periods was two hours.

Under the above conditions, the first catalyst described, namely, the catalyst formed by mixing silica hydrogel with alumina hydrosol, resulted in a conversion of 48% into gasoline constituents.

The second catalyst above mentioned resulted in a conversion of 48.5% into gasoline constituents.

Having described the preferred embodiment of the invention, it will be understood that it embraces such other variations and modifications as come within the spirit and scope thereof.

What is desired to be protected by Letters Patent is:

1. A method of cracking hydrocarbon oils which comprises passing the oil to be cracked in vapor form in contact with a catalyst formed by mixing silica gel with alumina hydrosol and thereafter drying the hydrosol to form a composite gel of silica and alumina, maintaining the oil in contact with said catalyst at a temperature and for a period sufficient to obtain a substantial conversion into motor fuel constituents.

2. The method defined in claim 1 wherein undried silica gel is combined with the alumina hydrosol.

3. The method defined in claim 1 wherein dry silica gel is admixed with alumina hydrosol.

4. The method defined in claim 1 wherein the molar ratio of silica to alumina in the catalyst is between about 2 to 1 and 20 to 1.

GERALD C. CONNOLLY.